P. T. SPINDLER.
PNEUMATIC OPERATING DEVICE FOR STREET AND STATION INDICATORS.
APPLICATION FILED JUNE 2, 1910.
986,098.
Patented Mar. 7, 1911.
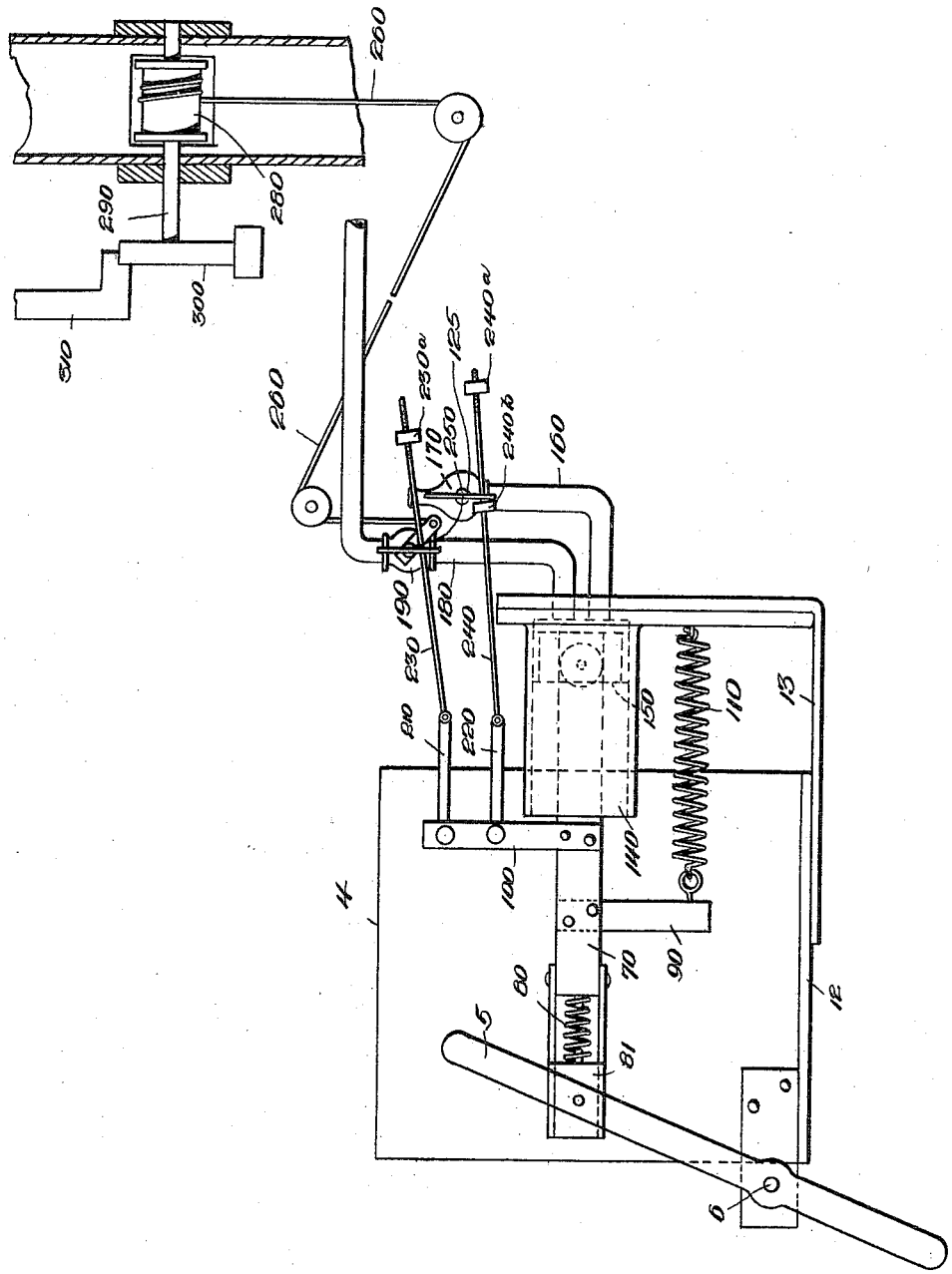
Witnesses
Inventor
P. T. Spindler.
by Bonnhardt & Co.
Attorneys

UNITED STATES PATENT OFFICE.

PERRY T. SPINDLER, OF CHICAGO, ILLINOIS, ASSIGNOR TO AMERICAN STREET AND STATION INDICATOR COMPANY, OF CHICAGO, ILLINOIS, A COPARTNERSHIP.

PNEUMATIC OPERATING DEVICE FOR STREET AND STATION INDICATORS.

986,098.

Specification of Letters Patent.

Patented Mar. 7, 1911.

Application filed June 2, 1910. Serial No. 564,573.

*To all whom it may concern:*

Be it known that I, PERRY T. SPINDLER, citizen of the United States, residing at Chicago, in the county of Cook and State of Illinois, have invented certain new and useful Improvements in Pneumatic Operating Devices for Street and Station Indicators, of which the following is a specification.

This invention relates to pneumatic operating devices for street and station indicators, and it is especially adapted and intended for use on electric cars.

The object of the invention is to provide improved means for actuating the operating lever of the indicator, by means of air pressure controlled by a trip mechanism carried by the trolley pole.

The invention is illustrated in the accompanying drawing which is a side elevation, partly in section, of the apparatus.

Referring specifically to the drawings, 4 indicates a street or station indicator provided with an operating lever 5 which is pivoted at 6 and is connected by a link 70 to a piston 150 in a cylinder 140, a shock absorbing spring 80 being confined between the end of the link 70 and a block 81 to which the lever is connected, said block being guided for movement on the link. The link has an arm 90 to which a spring 110 is connected for the return stroke.

Two pipes 160 and 180 open into the cylinder 140, the former pipe having a valve 170 and the latter having a valve 190. The pipe 180 is the inlet pipe, and pipe 160 is the outlet pipe. An arm 100 projects from the link 70. It is connected by a link 210 to a rod 230 which slides through the wing 250 of the valve 190, and the rod 230 has an adjustable strike piece 230$^a$ thereon, arranged to strike the valve wing or lever and close the valve after each operation. The arm 100 is also connected by a link 220 to a rod 240 which slides through an opening in the wing 125 of the valve 170, and this rod has strike pieces 240$^a$ and 240$^b$ on opposite sides of said wing, to operate the valve according to the movement of the rod.

The stem of the inlet valve 190 is also connected to a cord 260 which extends over suitable guide pulleys to a spool 280 located in the trolley pole 270, and the axle 290 of said spool projects beyond the pole and is provided at its outer end with a weighted member 300 fixed thereto and arranged to strike an arm 310 which will be secured to one of the guy wires.

When the arm 300 strikes the trip 310 the spool will be turned and a portion of the cable 260 will be wound on the spool thereby opening the valve 190 and allowing air to pass into the cylinder 140 forcing out the piston 150 and swinging the lever 5. During this time the valve 170 is closed, but at the completion of the stroke the block 240$^a$ strikes the wing 125 and opens the valve allowing the air to exhaust from the cylinder, and the spring 110 returns the lever to original position.

I claim—

1. In an operating mechanism for indicators, the combination of an operating pneumatic device, a valved inlet air pipe thereto, a trolley pole, a spool on the pole, a cable connecting the spool and the valve of the said inlet pipe, a trip operated member connected to the spool to turn the same and open the valve, and automatic means to close the valve and exhaust the air from the pneumatic device.

2. In an operating mechanism for indicators, the combination of an air cylinder having a piston therein connected to the indicator for operation thereof, valved inlet and exhaust pipes connected to said cylinder, an obstacle operated device connected to the inlet valve, to open the same, and means connected to the piston to close the inlet valve and to open and close the exhaust valve, said means including rods with stops thereon, slidable on the valve stems and arranged to strike said stems and turn the valves according to movement of the piston, and means to return the piston after each stroke.

In testimony whereof, I affix my signature in presence of two witnesses.

PERRY T. SPINDLER.

Witnesses:
NELLIE FELTSKOG,
H. G. BATCHELOR.

Copies of this patent may be obtained for five cents each, by addressing the "Commissioner of Patents, Washington, D. C."